(12) United States Patent
Ilan et al.

(10) Patent No.: US 7,693,151 B2
(45) Date of Patent: Apr. 6, 2010

(54) METHOD AND DEVICES FOR PROVIDING PROTECTION IN PACKET SWITCHED COMMUNICATIONS NETWORKS

(75) Inventors: Amir Ilan, Hod Hasharon (IL); Meir Agassy, Givataim (IL); Joseph Shapiro, Hod Hasharon (IL); David Matas, Rehovot (IL)

(73) Assignee: Veraz Networks Ltd., Petach Tikva (IL)

( * ) Notice: Subject to any disclaimer, the term of this patent is extended or adjusted under 35 U.S.C. 154(b) by 336 days.

(21) Appl. No.: 11/718,376

(22) PCT Filed: Nov. 1, 2005

(86) PCT No.: PCT/IL2005/001141

§ 371 (c)(1),
(2), (4) Date: May 1, 2007

(87) PCT Pub. No.: WO2006/048869

PCT Pub. Date: May 11, 2006

(65) Prior Publication Data

US 2008/0130678 A1 Jun. 5, 2008

(30) Foreign Application Priority Data

Nov. 3, 2004 (IL) .................................... 165010

(51) Int. Cl.
*H04L 12/28* (2006.01)
(52) U.S. Cl. .................. 370/392; 709/231; 386/46; 375/240
(58) Field of Classification Search ............... 370/310
See application file for complete search history.

(56) References Cited

U.S. PATENT DOCUMENTS 6,091,709 A 7/2000 Harrison et al.

(Continued)

FOREIGN PATENT DOCUMENTS

EP 1227624 A2 7/2002

(Continued)

OTHER PUBLICATIONS

Dongyan Xu et al., "Qo-S Directed Error Control of Video Multicast in Wireless Networks", Computer Communications and Networks, Oct. 11, 1999, Proceedings, Eight International Conference on Boston, MA, pp. 257-262.

(Continued)

*Primary Examiner*—Ayaz R Sheikh
*Assistant Examiner*—Nicholas Sloms
(74) *Attorney, Agent, or Firm*—Browdy & Neimark, PLLC (57) ABSTRACT

A method and devices using that method are provided for reconstructing an encoded signal conveyed along a communication path in a packet switched network. The method comprises the steps of providing a communication signal that has been encoded into a plurality of frames; determining which of the plurality of frames is an essential frame, which loss would cause a relatively substantial deterioration in the quality of at least one proceeding frame upon decoding that at least one proceeding frame; packaging the plurality of frames into a plurality of packets, and identifying which of the packets comprise at least one essential frame; adding protecting information to at least one packet which proceeds a packet identified as a packet carrying at least one essential frame.

18 Claims, 3 Drawing Sheets

U.S. PATENT DOCUMENTS

| | | | |
|---|---|---|---|
| 6,549,515 | B1 | 4/2003 | Sourani et al. |
| 6,650,644 | B1 | 11/2003 | Colley et al. |
| 2002/0169859 | A1 | 11/2002 | Serizawa |
| 2003/0012137 | A1 | 1/2003 | Abdelilah et al. |
| 2003/0099236 | A1 | 5/2003 | Wah et al. |
| 2006/0291468 | A1* | 12/2006 | Bopardikar et al. .......... 370/392 |

FOREIGN PATENT DOCUMENTS

| | | |
|---|---|---|
| WO | 0057606 | 9/2000 |
| WO | 0215488 A1 | 2/2002 |
| WO | 0230098 A2 | 4/2002 |
| WO | 2005088916 A1 | 9/2005 |

OTHER PUBLICATIONS

S.K. Singh et al., "A Dynamic-Priority Based Approach to Streaming Video Over Cellular Network", Computer Communications and Networks, Oct. 11, 2004, ICCCN 2004, Proceedings, 13th International Conference on Chicago, IL, pp. 281-286.

Mei Yong, "Study of Voice Packet Reconstruction Methods Applied to Celp Speech Coding", Digital Signal Processing 2, Estimation, VLSI, San Francisco, Mar. 23, 1992, vol. 5, Conf. 17, pp. 125-128.

Colin Perkins et al., "A Survey of Packet Loss Recovery Techniques for Streaming Audio", IEEE Network, Sep./Oct. 1998, pp. 40-48.

D. Black et al., "Per Hop Behavior Identification Codes", RFC 3140 by the Internet Society for the establishment of an international standard DIffServ, Jun. 2001.

S. Blake et al., "An Architecture for Differentiated Services", IETF Standard, Internet Engineering Task Force, Dec. 1998.

J. Heinanen et al., "Assured Forwarding PHB Group" RFC 2597 by the internet Society for the establishment of an international standard DiffServ, Jun. 1999.

D. Grossman, "New Terminology and Clarifications for DiffServ", RFC 3260 by the Internet Society or the establishment of an international standard DiffServ, Apr. 2002.

IESS-501 (Rev. 2) "Digital Circuit Multiplication Equipment Specification 32KBIT/S ADPCM With DSI", and Facsimile Demodulation/Remodulation, pp. 27-29, 1992.

K. Nichols et al. "Definition of the Differentiated Services Field (DS FIED) in the IPV4 IPV6 Headers"RFC 2474 by the internet Society for the establishment of an international standard DiffServ, Dec. 1998.

H. Sanneck, "Packet Loss Recovery and Control for Voice Transmission Over the Internet" GMD Research Series No. 8/2000, of GMD—Forschungszetrum Informationechnik GmbH.

T. Zhang et al., "Audio Content Analysis for Online Audiovisual Data Segmentation and Classification", IEEE Transaction on Speech and Audio Processing, IEEE Inc., New York, US, vol. 9 No. 4, pp. 441-457, May 2001.

* cited by examiner

METHOD AND DEVICES FOR PROVIDING PROTECTION IN PACKET SWITCHED COMMUNICATIONS NETWORKS

FIELD OF THE INVENTION

The present invention relates in general to telecommunication systems and methods for their management, and particularly to systems and methods for efficiently managing packet switched coded communication.

BACKGROUND OF THE INVENTION

In coded packetized communication such as a Voice Over Internet Protocol (VoIP) system, one or some voice frame data, which are obtained by encoding a voice signal, are gathered to form a packet. After adding some further information to the packet, such as generation time, sequence number etc., the latter is transmitted along a transmission path, e.g. the Internet. The packets are successively transmitted along the transmission path and arrive at a processing point, e.g. to a receiver. Typically, the processing point is provided with a buffer (queue) for re-arranging the packets received in accordance with their transmission time, so that to overcome different arrival delays resulting from various network problems such as congestion of various links, and then the received packets are decoded.

However, suppose a packet does not arrive on time at the reception buffer. Typically, the information included in that missing packet is derived by interpolation processing using the prior frames received, a process which is called error concealment processing.

Several attempts were made to overcome these problems and enable reception of the signal in a good quality. Among the attempts made is US 20020169859A1 which describes a voice decoding apparatus with packet error resistance, which, in case a packet is not received at the appropriate time when it should be decoded, the decoded signal and a filter memory value would be calculated at that time by using a concealment processing. However, in case a packet is later received (a delayed packet), the packet would nevertheless be used in recalculating the filter memory value for frames that were formed later than the time stamp of the lost packet. This way, it would be possible to reduce/remove the long-term deterioration effect caused by the concealment processing in the filter memory value. However, no solution is provided by this publication to many cases where the packet recalculation of the filter memory value cannot be made.

WO 0230098 describes a method whereby voice is sampled and encoded to produce data that represents speech prior to its transmission. Adaptive multi-rate (AMR) speech codecs represent generation of coding algorithms that are designed to work with inaccurate transport channels, such as wireless transmission channels. The AMR speech codec has built-in mechanisms that make it tolerant to a certain level of bit errors introduced by the transport channel. Therefore, would be possible to restore the original speech with some degradation even though the coded speech is received with some bit errors.

In a publication entitled "Packet Loss and Control for Voice Transmission over the Internet" by Henning Sanneck, GMD Research Series No. 8/2000, of GMD—Forschungszentrum Informationtechnik GmbH, a further step was made. Relying on the fact that some of the coded voice frames, namely, frames where there has been a transition state form unvoiced signal to a voiced signal, comprise more important information than other frames, it has been suggested to provide these frames with extra protection. Two solutions were proposed in this publication. The first, to attach a replica of each of the so-called important frames that is carried by the N-th packets, to the N+2th packets, so that if such an Nth packet is lost, the important packet can still be regenerated from its replica carried by the N+2th packet The other solution suggested, is, that a XOR operation is carried on the Nth and N+1th packets, irrespective of the information comprised therein, and the result obtain from this operation is attached to the N+2th packet. Still, both these solutions have their drawbacks as they introduce a delay in the regenerated packet, and more importantly, they lead to a waste of bandwidth consumed by carrying the replicas of all important frames according to the first solution or even the bandwidth used for carrying the results of all those XOR operations

SUMMARY OF THE INVENTION

It is therefore an object of the present invention to provide a method for improving the reconstruction of encoded signals conveyed along packet switched networks.

It is yet another object of the present invention to provide a system and an apparatus capable of improving the quality of signals conveyed in their encoded form along packet switched networks.

Other objects of the invention will become apparent as the description of the invention proceeds.

In accordance with one embodiment of the present invention, there is provided a method for reconstructing a compressed signal conveyed along a communication path in a packet switched network, wherein the method comprising the steps of:

providing a communication signal that has been encoded into a plurality of frames;

determining which of said plurality of frames is an essential frame which loss would cause a relatively substantial deterioration in the quality of at least one proceeding frame, when said at least one proceeding frames be decoded;

packaging said plurality of frames into a plurality of packets, and identifying which of the packets comprise at least one essential frame;

adding protecting information to at least one packet which proceeds a packet identified as a packet carrying at least one essential frame.

The term "protecting information" as used herein, should be understood to encompass information that will enable successful decoding of at least one frame which proceeds the essential frame. Such protecting information may be for example, some of the parameters characterizing the essential frame and/or information that is not explicitly derived from the encoded parameters of the essential frame. By another example, the protecting information may be information which relates to the encoder state of the proceeding frame, wherein such information would normally be implicitly conveyed within the information included in the encoded signal of the essential frame. An essential frame is such that its loss will cause substantial incompatibility between the state of the encoder and the state of the decoder, which will consequently prevent successful decoding and re-synthesis of the encoded information comprising in the frames that follow the lost essential frame.

The terms "proceeding frame" or "frame that proceeds", as used herein and throughout the specification, should be understood to encompass a frame (or frames) encoded in accordance with information derived from at least one frame of interest (e.g. an essential frame), irrespective whether such a proceeding frame follows time-wise the frame of interest, or not. For example, when the signal is of a voice type, a proceeding frame would typically be a frame that follows timewise the frame of interest. However, when the signal is for example a video signal, motion estimation can be carried out either by moving forward or backward in time, and a proceeding frame will be encoded respectively in accordance with information comprised in respective time-wise past or future frames(s) of interest.

As will be appreciated by those skilled in the art, a somewhat similar solution may be derived by introducing a delay to the frames that should be transmitted, so that in such a case the protecting information that will be used by at least one of the proceeding frames will be carried by a packet the precedes the essential frame. Such a method should also be understood to be encompassed within the scope of the present invention.

In case the packet carrying the at least one essential frame is lost, the protecting information is adapted to allow decoding and synthesis of at least one frame comprised in the proceeding frame at a better quality than the quality that would have been achieved had the at least one frame that proceeds said essential frame been reconstructed without using said protecting information for its decoding and synthesis.

In accordance with another embodiment of the invention, the step of determining which of said plurality of frames is an essential frame, comprises determining a plurality of frames, which loss will cause a relatively substantial deterioration in the quality of at least one proceeding frame, when said at least one proceeding frames be decoded.

Using such protecting information will allow, in case of a loss of an essential frame, a faster synchronization between the state of the encoder at the transmitting end and the state of the decoder at the receiving end within a matter of few frames. Better decoding and synthesis of the encoded signal is obtained until resynchronization is achieved. In case no protecting information is provided, such synchronization will typically not be achieved during that phoneme, and consequently that phoneme could not be reconstructed properly.

According to another embodiment of the invention, the protecting information comprises the excitation vector of the synthesis process. Preferably, not the entire excitation vector is added as the protecting information, but only parameters that may provide sufficient information to be used as the protecting information. For example, the locations of at least some of the peaks of the excitation vector, the gain of these peaks, and the like. Preferably, the respective excitation vector of the synthesis process is represented by an index denoting a vector out of a plurality of vectors associated with possible excitation vectors.

By yet another embodiment of the invention, the method provided further comprises a step of attaching an indication to at least one of the packets comprising protecting information, to denote that protecting information was added to that packet. Preferably, that indication is added to the first (timewise) packet out of the packets comprising protecting information that relates to a single essential frame.

According to still another embodiment of the invention, protecting information is added to more than one packet. Preferably, the protecting information added to the first packet(s) comprises information that would allow course reconstruction of the signal, while the proceeding packets will allow a finer reconstruction of the signal. This way, if the load of the protecting information requires a relatively considerable bandwidth, it may be divided as explained above, so that the load is shared between a number of packets, without having a substantial adverse effect on the signal being reconstructed.

In accordance with yet another embodiment of the invention, the method provided further comprises a step of initiating a recovery process at receiving end of the packet switched network, if the packet carrying the at least one essential frame does not arrive to allow successful decoding of its proceeding packets, whereby the protecting information is derived from the proceeding packet, enabling the reconstruction of at least one frame comprised in one of the proceeding packets at a quality which is substantially similar to that that would have been achieved had the packet carrying the at least one essential frame not been lost.

According to an embodiment of the invention, the communication signal is a member selected from the group consisting of voice type, audio type and video type. Preferably, if the communication signal is of a voice type, the at least one essential frame comprises information which relates to a transition from unvoiced signal (e.g. fricative phoneme) or silence, to a voiced signal.

The term "frame" as used herein, should be understood also to encompass both a full frame as well as a part of a frame. For example, the protecting information referred to hereinbefore may relate to the compressed signal of the whole frame or of a part of a frame (sub-frame), or both, so that the reconstruction that should take place while using the protecting information provided in the proceeding packet, will relate to information comprised in the respective part of the frame.

The term "packet switched communication network" as will be used hereinafter, should be understood to encompass the various types of networks known in the art, such as synchronous and asynchronous transfer networks, for example ATM networks, Ethernet networks, IP networks, frame relaying networks, Metropolitan Area Networks (MAN), Wide Area Networks (WAN), Local Area Network (LAN), packet over SONET/SDH networks, wireless networks and the like.

According to another embodiment of the invention, the encoded frames are obtained by using a compressing algorithm that is a) based on a model which parameters are estimated and the initial values of the model variables are provided, and/or b) which operation depends on synchronization between the encoder and decoder, e.g. wave form compression algorithm, such as ADPCM.

The term "algorithm" as will be used hereinafter, refers to various ways of handling the communication signals. Such algorithms, typically operative as encoders and/or decoders, encompass signal relaying such as demodulation/remodulation relay, various types of lossy or lossless compression, variable rate compression, transcoding and the like.

According to still another embodiment of the invention, the protecting information is associated with a change in the characteristics of said encoded signal By another embodiment of the invention there is provided an encoding device which comprises:

means for receiving a communication signal;

means for encoding said communication signal into a plurality of frames;

means for determining which of said plurality of frames is an essential frame which loss will cause a relatively substantial deterioration in the quality of at least one proceeding frame, upon decoding said at least one proceeding frame;

means for packaging said plurality of frames into a plurality of packets, and identifying which of the packets comprises at least one essential frame;

means for adding protecting information to at least one packet which proceeds a packet identified as a packet carrying at least one essential frame; and a conveying means adapted to forward the plurality of packets towards their respective destination.

By still another embodiment of the invention there is provided an apparatus which comprises:

an input interface adapted to receive a communication signal;

an encoding device operative to encode said communication signal into a plurality of encoded frames;

a detector adapted to determine which of said plurality of frames is an essential frame which loss will cause a relatively substantial deterioration in the quality of at least one proceeding frame when said at least one proceeding frames be decoded, a processor adapted to add protecting information to at least one packet which proceeds a packet identified as a packet carrying at least one essential frame;

a packetizer operative to aggregate said plurality of frames into a plurality of packets, and identify which of the packets comprises at least one essential frame; and a transmitter adapted to forward said plurality of packets towards their respective destination.

According to yet another embodiment of the invention, the processor is further adapted to add an indication to at least one of the packets which comprise protecting information, to denote that protecting information was added to that packet. Preferably, that indication is added to the first (time-wise) packet out of the packets comprising protecting information.

In accordance with still another embodiment of the invention, the apparatus further comprises at least one signal decoder and synthesizer adapted to reconstruct the encoded frames and identify the essential frames among the encoded frames.

By yet another embodiment of the invention there is provided a decoding device which comprises:

an input interface adapted to receive a plurality of packets from one or more upstream nodes, wherein the plurality of packets is associated with an encoded communication signal and wherein at least one of the plurality of packets comprises protection information;

a receiving buffer adapted to:

i) store a pre-defined number of packets received;

ii) determine whether each of the packets belonging to the compressed communication arrived in time for its reconstruction; and iii) determine in case that at least one of the packets did not arrive in time, whether its consecutive packet comprise protecting information a processor coupled with the receiving buffer and adapted to retrieve protecting information from frames carrying such protecting information, and have that protecting information processed;

a packet loss concealment circuit operative to receive the processed packets and generate information that enables reconstruction Of missing packets;

a decoder operative to provide a decoded form of the packets received, and to decode and synthesize a communication signal therefrom in conjunction with the protecting information retrieved and processed by the processor.

DETAILED DESCRIPTION OF THE INVENTION

The present invention will be understood and appreciated more fully from the following detailed examples taken in conjunction with the drawings.

Figure 1:
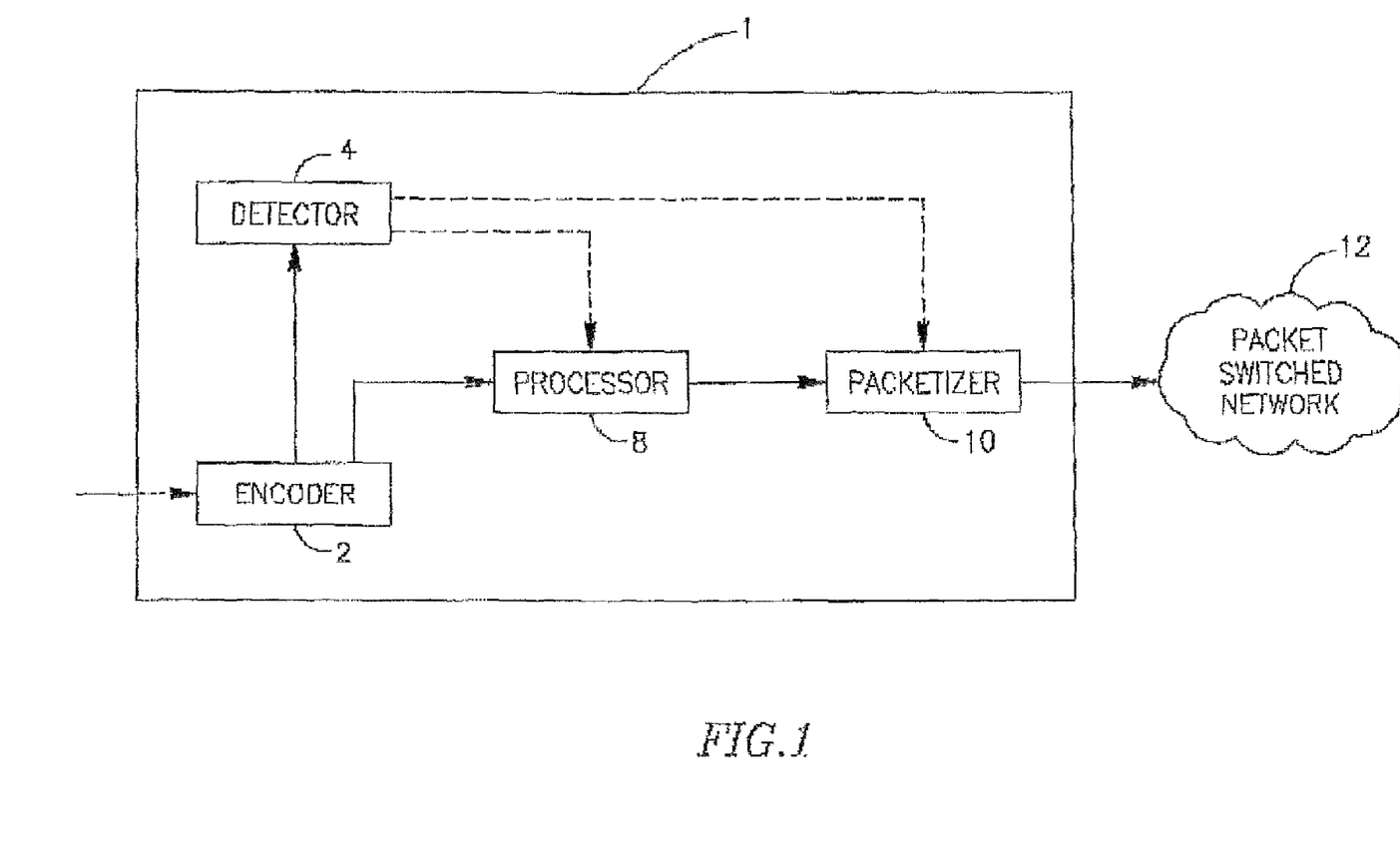
FIG. 1 presents a block diagram showing a structure example of a voice encoding apparatus according to an embodiment of the invention.

Let us consider now FIG. 1 which presents an example of a schematic block diagram of an encoding apparatus according to an embodiment of the present invention.

Assuming that the signal that reaches the encoding device 1 is a voice signal, and that it is encoded by using a CELP (Code Excited Linear Prediction) encoder. The encoding in encoder 2 is conducted by extracting linear prediction (LP) coefficients representing a spectrum envelope characteristic obtained in a linear prediction analysis, and an excitation signal for driving an LP synthesis filter constructed out of these LP coefficients from an input voice signal, and encoding them.

The encoding of the LP analysis and the LP coefficients is conducted for every frame of predetermined length.

The signal received in encoding device 1 is encoded by encoder 2 and the encoded signal is forwarded to detector 4 and to packetizer 10. Detector 4 is operative to detect the essential frames from among the plurality of frames. The frames encoded by encoder 2 are then processed by processor 8 and certain information is retrieved therefrom. Once detector 4 identifies a frame as being an essential frame, processor 8 ensures that the information retrieved in connection with the essential frame, now considered as being protecting information, shall be included in the next packet prepared by packetizer 10. Preferably, processor 8 also minimizes the protecting information that will be added to that packet so that only the essential protecting information is added in order to save on the bandwidth used.

As can be appreciated by those skilled in the art, an equivalent result may be achieved if detector 4 controls directly packetizer 10. In such a case, the relevant information is retrieved for all the packets, but the decision on its addition only to certain packets as protecting information, is based on the determination made by detector 4.

Figure 2A:
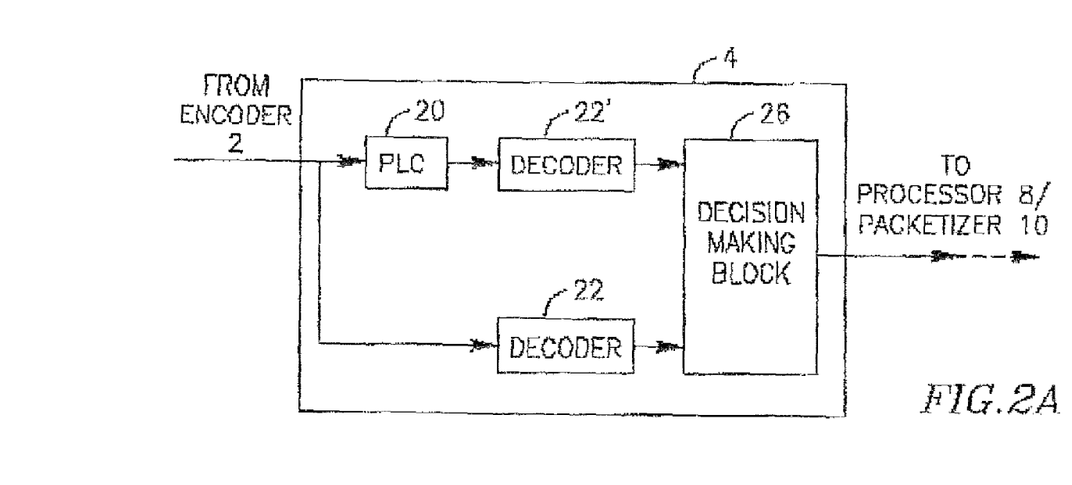
FIGS. 2A and 2B illustrate two option of constructing a detector of the voice encoding apparatus of FIG. 1.

FIG. 2A present an exploded view of detector 4 constructed in accordance with an embodiment of the invention. All encoded frames are received in detector 4, and are processed in two parallel branches. Along the first branch, the encoded frame n is decoded and synthesized by a corresponding decoder 22. Along the second branch, a simulation of discarding frame (n−1) is made, a packet loss concealment process is carried for that discarded packet by packet loss concealment device 20. Thereafter frame n is decoded and synthesized by decoder 22' and the resulting signals from both decoders 22 and 22' are compared. When there is a substantial difference between the two, frame n−1 is determined by decision making block 26 to be an essential frame. Similarly, the impact of losing a frame, over more then one proceeding frames may also be evaluated. In addition or in the alternative, if the difference found between the delay lines of both synthesis filters or the respective excitation vectors is greater than the pre-defined threshold, decision block 26 makes the determination that the preceding frame was an essential frame.

Figure 2B:
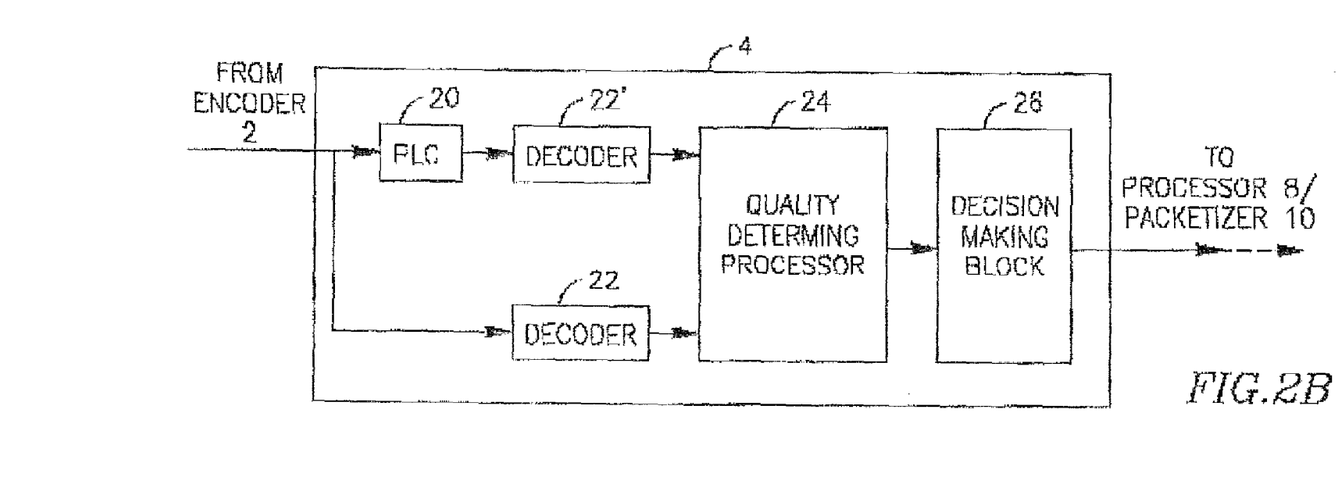

FIG. 2B demonstrates a similar construction of detector 4, with the exception that the resulting two reconstructed signals are processed by processor 24 to determine the relative difference in quality of the reconstructed signals thus received. Based on the evaluated quality, decision making block 26 determines which are the essential frames, e.g. frames that without them the proceeding frames shall have less then a pre-defined quality threshold.

In addition or in the alternative, a more complex processing may be carried by which, after making the decision which are the essential frames, the minimum protecting information is determined. By this method, signal synthesizer 22' receives frame n together with minimal protecting information which relates to the preceding frame, n−1. Frame n is then reconstructed while the reconstruction takes into account the minimal protecting information, and the quality of the reconstructed signal is then evaluated by processor 24. If the resulting quality is still less then required, some further protecting information is added, the reconstructing process is repeated and is carried until a sufficient quality of the reconstructed signal is achieved. By this embodiment, the final protecting information applied, is conveyed to packetizer 10 to be added to packet n.

As will be appreciated by those skilled in the art, the above two examples are only few of the options available for determining the essential frames, but of course the invention is not limited to these two options and any other arrangement that achieve the same result may be used without departing from the scope of the invention.

Figure 3:
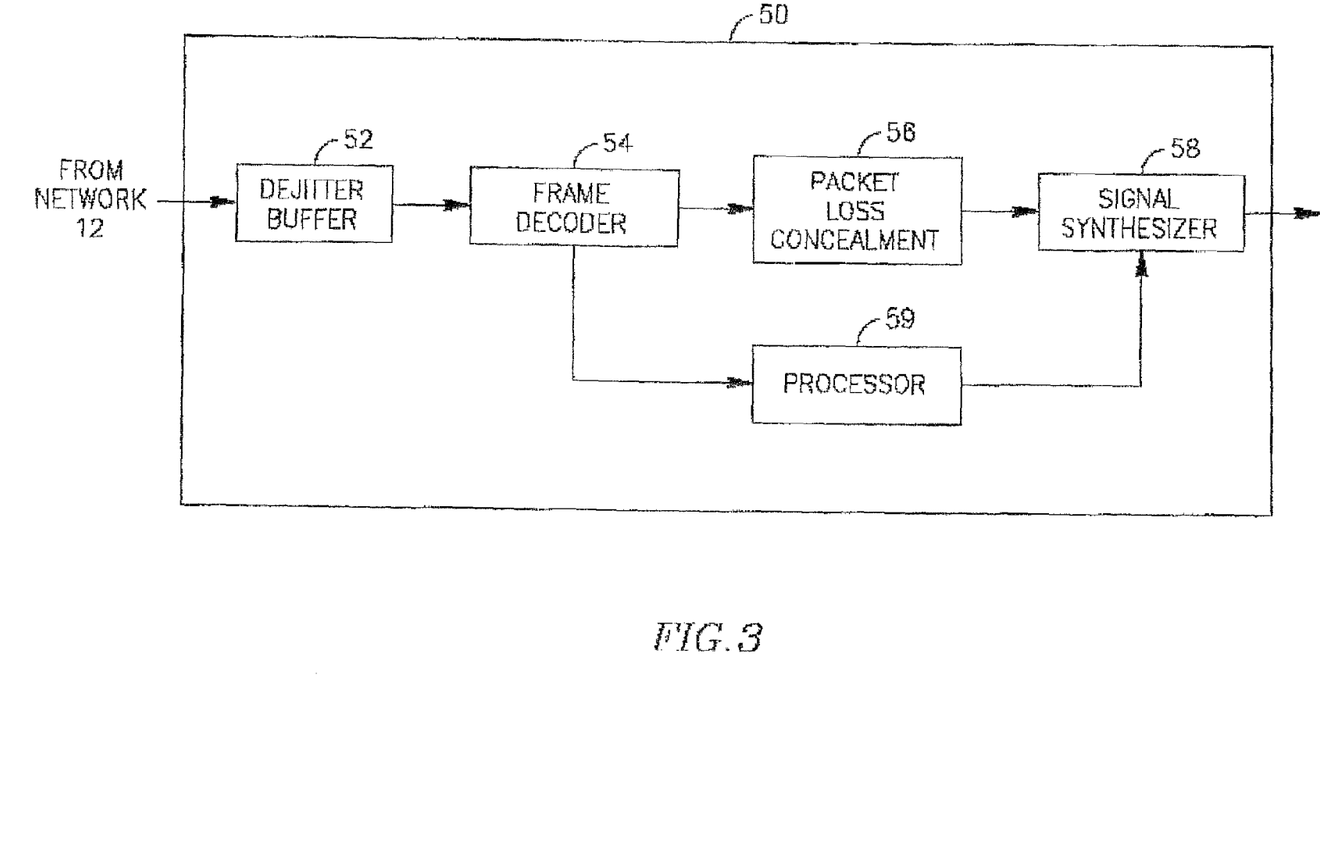
FIG. 3 presents a block diagram showing a structure example of a voice decoding apparatus according to an embodiment of the invention.

In the corresponding decoding apparatus 50 illustrated in FIG. 3, the excitation signal calculated is input to the synthesis filter constructed out of the decoded LP coefficients to synthesize a decoded voice signal. An arriving packet is first transferred to a reception buffer 52 where certain number of packets are accumulated. The accumulated packets are rearranged by the order of their generation time, and buffer 52 then determines any missing or packets that are late arriving. The arriving packets are then transferred to frame decoder 54 and a packet loss concealment circuit 56, which is operative if a packet was lost by conducting a packet loss concealment process as known in the art per se. Once frame decoder 54 identifies a frame carrying protection information and the fact that the preceding frame was lost is known, decoder 54 retrieves that protecting information which is then sent to processor 59 that uses the protecting information to establish information required to prevent long term deterioration effect of the decoded signal due to the loss of the essential frame (e.g. restoring the excitation vector used in the synthesis filter). The information established by processor 59 is then forwarded to signal synthesizer 58 and used therein in the process for obtaining the required decoded signal.

It is to be understood that the present invention has been described using non-limiting detailed descriptions of embodiments thereof that are provided by wav of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method for reconstructing an encoded signal conveyed along a communication path in a packet switched network, wherein the method comprising the steps of:
   providing a communication signal that has been encoded into a plurality of frames;
   determining which of said plurality of encoded frames is an essential frame, which loss would cause a deterioration in the quality of at least one proceeding frame upon decoding said at least one proceeding frame;
   packaging said plurality of frames into a plurality of packets, and identifying which of the packets comprise at least one essential frame;
   adding protecting information to at least one packet which proceeds a packet identified as a packet carrying at least one essential frame,
   wherein said step of determining which of said plurality of frames is an essential frame comprises at least one of the following options I-IV:
   I. a) processing the communication signal that has been encoded in a plurality of frames by:
      i) at least partially decoding and synthesizing a given encoded frame associated with the communication signal, and
      ii) simulating a discard of at least one frame that precedes said given encoded frame associated with the communication signal, and thereafter at least partially decoding and synthesizing the given encoded frame associated with the communication signal,
      b) comparing both decoded and synthesized signals thus obtained, and
      c) if there is a difference between said two compared signals which is greater than a predefined threshold, determining that said preceding encoded frame is an essential frame,
   II. a) processing a communication signal that has been encoded in a plurality of frames by:
      i) at least partially decoding a given encoded frame associated with the communication signal, using a first synthesis filter, and
      ii) simulating a discard of at least one frame that precedes said given encoded frame, and thereafter at least partially decoding the given encoded frame, using a second synthesis filter,
      b) comparing differences found in delay lines associated with both said synthesis filters, and
      c) if there is a difference between said two delay lines which is greater than a predefined threshold, determining that said preceding encoded frame is an essential frame,
   III. a) processing a communication signal that has been encoded in a plurality of frames by:
      i) at least partially decoding and synthesizing a given encoded frame associated with the communication signal and
      ii) simulating a discard of at least one frame that precedes said given encoded frame,
      and thereafter at least partially decoding and synthesizing the given encoded frame,
      b) determining difference in quality between said two at least partially decoded and synthesized signals, and
      c) if there is a difference between the quality of said two at least partially decoded and synthesized signals which is greater than a predefined threshold, determining that said preceding encoded frame is an essential frame, IV. a) processing a communication signal that has been encoded in a plurality of frames by:
  i) at least partially decoding and synthesizing a given encoded frame to generate a first excitation vector, and
  ii) simulating a discard of at least one frame that precedes said given encoded frame,
  and thereafter at least partially decoding and synthesizing said given encoded frame to generate a second excitation vector,
  b) comparing differences found between said two excitation vectors, and
  c) if there is a difference between said two excitation vectors which is greater than a predefined threshold, determining that said preceding encoded frame is an essential frame.

2. A method according to claim 1, wherein said protecting information is adapted to allow in case the packet carrying said at least one essential frame is lost, decoding and synthesizing of at least one frame comprised in said proceeding packet at a better quality than the quality that would have been achieved had the at least one frame that proceeds said essential frame been reconstructed without using said protecting information for its decoding and synthesis.

3. A method according to claim 1, wherein said step of determining which of said plurality of frames is an essential frame, comprises determining a plurality of frames, which loss will cause a deterioration in the quality of at least one proceeding frame, when said at least one proceeding frames is decoded.

4. A method according to claim 1, wherein said protecting information comprises information relating to a respective state or part of the state of the encoder used to encode said signal.

5. A method according to claim 1, wherein said protecting information is associated with a change in the characteristics of said encoded signal.

6. A method according to claim 1, further comprising a step of attaching an indication to at least one of the packets comprising protecting information, to denote that protecting information was added to that packet.

7. A method according to claim 6, wherein said indication is attached to a first packet out of the packets comprising protecting information that relates to a single essential frame.

8. A method according to claim 1, wherein said protecting information is divided among a plurality of packets.

9. A method according to claim 8, wherein the protecting information added to a first packet of said plurality of packets comprises information that would allow a first reconstruction of the signal, while the proceeding packets will carry the remaining of the protecting information that will allow a second reconstruction of the signal.

10. A method according to claim 1 wherein said step of determining which of said plurality of encoded frames is an essential frame comprises option I, further comprising a step of determining minimum protecting information required for said given encoded frame which comprises:
  a) processing said given encoded frame by:
    i) assuming a set of minimum information data required as protecting information to be included in said given frame and
    ii) simulating a discard of said essential frame and at least partially decoding and synthesizing a communication signal associated with said given encoded frame which proceeds an essential frame, while utilizing the assumed set of minimum information data required,
  b) comparing both communication signals thus obtained, and
  c) if the difference between said two compared communication signals exceeds a pre-defined threshold, assuming a new set of information data and repeating steps a)ii), b) and c).

11. A method according to claim 1 wherein said step of determining which of said plurality of encoded frames is an essential frame comprises option II, further comprising a step of determining minimum protecting information required for said given encoded frame which comprises:
  a) processing said given encoded frame by:
    i) assuming a set of minimum information data required as protecting information to be included in said given frame, and
    ii) simulating a discard of said essential frame and at least partially decoding a communication signal associated with said given encoded frame which proceeds an essential frame while utilizing the assumed set of minimum information data required, using said second synthesis filter,
  b) comparing differences found in delay lines associated with both said synthesis filters, and
  c) if the difference between said two delay lines exceeds a pre-defined threshold, assuming a new set of information data and repeating steps a)ii), b) and c).

12. A method according to claim 1 and wherein said step of determining which of said plurality of encoded frames is an essential frame comprises option III, further comprising a step of determining minimum protecting information required for said given encoded frame which comprises:
  a) processing said given encoded frame by:
    i) assuming a set of minimum information data required as protecting information to be included in said given frame and
    ii) simulating a discard of said essential frame and at least partially decoding and synthesizing a communication signal associated with said given encoded frame which proceeds an essential frame, while utilizing the assumed set of minimum information data required,
  b) determining relative difference between said two at least partially decoded and synthesized communication signals, and
  c) if the difference between said two at least partially decoded and synthesized communication signals exceeds a pre-defined threshold, assuming a new set of information data and repeating steps a)ii), b) and c).

13. A method according to claim 1 and wherein said step of determining which of said plurality of encoded frames is an essential frame comprises option IV, further comprising a step of determining minimum protecting information required for said given encoded frame which comprises:
  a) processing said given encoded frame by:
    i) assuming a set of minimum information data required as protecting information to be included in said given frame, and
    ii) simulating a discard of said essential frame and at least partially decoding a communication signal associated with said given encoded frame which proceeds an essential frame while utilizing the assumed set of minimum information data required, using said second excitation vector, b) comparing differences found in said two excitation vectors, and c) if the difference between said two excitation vectors exceeds a pre-defined threshold, assuming a new set of information data and repeating steps a)ii), b) and c).

14. A method according to claim 1, wherein said protecting information to be used in conjunction with one or more frames carried by said at least one proceeding packet, is added to at least one packet that precedes a packet carrying an essential frame.

15. An encoder which comprises:
means for receiving a communication signal;
means for encoding said communication signal into a plurality of frames;
means for determining which of said plurality of frames is an essential frame which loss will cause a deterioration in the quality of at least one proceeding frame, upon decoding said at least one proceeding frame;
means for packaging said plurality of frames into a plurality of packets, and identifying which of the packets comprises at least one essential frame;
means for adding protecting information to at least one packet which proceeds a packet identified as a packet carrying at least one essential frame; and
a conveying means adapted to forward the plurality of packets towards their respective destination.

16. An encoding apparatus which comprises:
an input interface adapted to receive a communication signal;
an encoding device operative to encode said communication signal into a plurality of encoded frames;
a detector adapted to determine which of said plurality of frames is an essential frame which loss will cause a deterioration in the quality of at least one proceeding frame when said at least one proceeding frames be decoded,
a processor adapted to add protecting information to at least one packet which proceeds a packet identified as a packet carrying at least one essential frame;
a packetizer operative to aggregate said plurality of frames into a plurality of packets, and identify which of the packets comprises at least one essential frame; and
a transmitter adapted to forward said plurality of packets towards their respective destination,
wherein said processor is adapted to determining which of said plurality of encoded frames is an essential frame comprises at least one of the following options I-IV:

I. a) processing the communication signal that has been encoded in a plurality of frames by:
  i) at least partially decoding and synthesizing a given encoded frame associated with the communication signal, and
  ii) simulating a discard of at least one frame that precedes said given encoded frame associated with the communication signal, and thereafter at least partially decoding and synthesizing the given encoded frame associated with the communication signal,
  b) comparing both decoded and synthesized signals thus obtained, and
  c) if there is a difference between said two compared signals which is greater than a predefined threshold, determining that said preceding encoded frame is an essential frame, II. a) processing a communication signal that has been encoded in a plurality of frames by:
  i) at least partially decoding a given encoded frame associated with the communication signal, using a first synthesis filter, and
  ii) simulating a discard of at least one frame that precedes said given encoded frame, and thereafter at least partially decoding the given encoded frame, using a second synthesis filter,
  b) comparing differences found in delay lines associated with both said synthesis filters, and
  c) if there is a difference between said two delay lines which is greater than a predefined threshold, determining that said preceding encoded frame is an essential frame, III. a) processing a communication signal that has been encoded in a plurality of frames by:
  i) at least partially decoding and synthesizing a given encoded frame associated with the communication signal and
  ii) simulating a discard of at least one frame that precedes said given encoded frame, and thereafter at least partially decoding and synthesizing the given encoded frame,
  b) determining difference in quality between said two at least partially decoded and synthesized signals, and
  c) if there is a difference between the quality of said two at least partially decoded and synthesized signals which is greater than a predefined threshold, determining that said preceding encoded frame is an essential frame, IV. a) processing a communication signal that has been encoded in a plurality of frames by:
  i) at least partially decoding and synthesizing a given encoded frame to generate a first excitation vector, and
  ii) simulating a discard of at least one frame that precedes said given encoded frame, and thereafter at least partially decoding and synthesizing said given encoded frame to generate a second excitation vector,
  b) comparing differences found between said two excitation vectors, and
  c) if there is a difference between said two excitation vectors which is greater than a predefined threshold, determining that said preceding encoded frame is an essential frame.

17. An encoding apparatus according to claim 16, wherein said packetizer is further adapted to add an indication to at least one of the packets which comprise protecting information so as to denote that protecting information was added to said packet.

18. An encoding apparatus according to claim 16, further comprising at least one signal decoder and synthesizer adapted to at least partially decode and synthesize the encoded frames and identify the essential frames among the encoded frames.

* * * * *